(12) United States Patent
Pinto

(10) Patent No.: US 9,306,962 B1
(45) Date of Patent: Apr. 5, 2016

(54) SYSTEMS AND METHODS FOR CLASSIFYING MALICIOUS NETWORK EVENTS

(71) Applicant: Niddel Corp, Miami, FL (US)

(72) Inventor: Alexandre De Melo Correia Pinto, San Francisco, CA (US)

(73) Assignee: NIDDEL CORP, Miami, FL (US)

( * ) Notice: Subject to any disclaimer, the term of this patent is extended or adjusted under 35 U.S.C. 154(b) by 0 days.

(21) Appl. No.: 14/340,397

(22) Filed: Jul. 24, 2014

Related U.S. Application Data

(60) Provisional application No. 61/858,498, filed on Jul. 25, 2013.

(51) Int. Cl.
| | | |
|---|---|---|
| *H04L 29/06* | (2006.01) | |
| *G06N 99/00* | (2010.01) | |
| *G06F 21/34* | (2013.01) | |
| *G06F 21/35* | (2013.01) | |

(52) U.S. Cl.
CPC .......... *H04L 63/1416* (2013.01); *G06N 99/005* (2013.01); *H04L 63/1425* (2013.01); *G06F 21/34* (2013.01); *G06F 21/35* (2013.01)

(58) Field of Classification Search
CPC ....... G06F 21/55; G06F 21/552; G06F 21/56; G06F 21/566; H04L 63/1416; H04L 63/0227; H04L 63/20; H04L 63/1408
See application file for complete search history.

(56) References Cited

U.S. PATENT DOCUMENTS

| | | | | |
|---|---|---|---|---|
| 2007/0143850 A1* | 6/2007 | Kraemer et al. | | 726/25 |
| 2008/0027891 A1* | 1/2008 | Repasi et al. | | 706/52 |
| 2008/0034425 A1* | 2/2008 | Overcash et al. | | 726/22 |
| 2011/0004692 A1* | 1/2011 | Occhino et al. | | 709/228 |
| 2014/0007222 A1* | 1/2014 | Qureshi et al. | | 726/16 |
| 2014/0157405 A1* | 6/2014 | Joll et al. | | 726/22 |
| 2014/0344401 A1* | 11/2014 | Varney et al. | | 709/217 |

OTHER PUBLICATIONS

Towards an Intelligent Security Event Information Management System; Guillermo Suarez-Tangil, Esther Palomar, Arturo Ribagorda; Department of Computer Science Carlos III University of Madrid, Spain Yan Zhang† Simula Research Laboratory, Norway; Jan. 2013 (pp. 1-19).*

Mats Andreassen, Kåre Marius Blakstad; Security in Cloud Computing a Security Assessment of Cloud Computing Providers for an Online Receipt Storage; Norsegian University of Science and Technology;Jume 2010, pp. 1-118.*

* cited by examiner

*Primary Examiner* — Mohammad A Siddiqi
(74) *Attorney, Agent, or Firm* — Hayes Soloway P.C.

(57) ABSTRACT

A system for classifying events on a computer network includes an event clustering engine for receiving event and log data related to identifiable actors from a security information and event management (SIEM) or log management module and selecting behavioral groupings of the event and log data. An affinity-based feature generation module assigns a value to each identifiable actor based on occurrences within predetermined time intervals of the identifiable actors having the selected behavioral grouping. A time-based weighting decay module applies a time decaying function to the assigned values for each identifiable actor. A feature engineering storage module stores information relating to the identifiable actors and their associated time-decayed values. A machine learning module generates a prediction model based on information received from the event clustering engine and the time-based weighting decay module, and the prediction model is utilized by a prediction engine on a computer to predict and classify received event and log data as malicious or non-malicious.

20 Claims, 4 Drawing Sheets

SYSTEMS AND METHODS FOR CLASSIFYING MALICIOUS NETWORK EVENTS

CROSS REFERENCE TO RELATED APPLICATIONS

This application claims priority from U.S. Provisional Application Ser. No. 61/858,498, filed Jul. 25, 2013, the contents of which are incorporated herein by reference.

FIELD

The present invention relates to systems and methods for classifying events on a computer network. In particular, the invention relates to prediction and classification of malicious network events through the use of prediction models generated by machine learning techniques. The invention has particular utility in the context of identification of malicious events and actors in a computer network, although other utilities are contemplated.

BACKGROUND

The field of log management and storage has developed greatly in the past 10 years, where the information that is possible to store on those systems has been consistently increasing, and the systems themselves have become faster to permit a bigger number of queries on the stored data.

These tools were originally created to assist security analysts with monitoring computer networks to pinpoint potential attacks and breaches on the networks they are defending. By putting all this data in one place, they should be able to review the totality of the log events in the network on a single environment, but that is just too much data for human analysts to make sense of.

In response to this challenge, SIEM (Security Information and Event Management) systems were put into practice, where in addition to the log management aspects described previously, deterministic correlation rule sets have been introduced. With this advancement, vast amounts of logs can be summarized in simple rule sets that trigger an event from the system if a certain type of log event happens above a certain threshold in any given time span or if an specific log event happens in sequence with another one, where those events are related do one another in some shape or form. More complicated rules can be designed by the combination and iteration of the above described, but these are the primitives that all correlation rules are based upon.

These deterministic correlation rules are able to support decision making in information security monitoring, but only to a certain extent. One of the issues is that the specific thresholds or the exact composition of rules that should be used for effective information security monitoring vary widely throughout organizational computer networks, reducing the overall utility of manual configuration of those rule sets to make sense of the ever increasing log data.

Moreover, the expression and compositions of this rules to achieve operation effectiveness in information security monitoring is very time consuming, incurring significant consulting or internal analyst costs. And even as a relative success is reached, the evolution in the organizational network assets, their normal behavior and other changes in the status quo of network configuration rapidly unbalance the work performed and invites constant review and re-tuning of those rules and thresholds.

Some advances have been attained in the implementation of behavioral and anomaly detection rules, but these have limited effectiveness as they: base their evaluation of normalcy in only a relative short period of time in the target network; and that they limit their expression in the vocabulary of the deterministic rules, trying to define thresholds and event chaining composition to express a complicated behavior that could be relevant to an analyst.

As a result of this situation, the current state of the art in using these SIEM and log management tools is plagued by an ever increasing amount of log entries, fueled by the recent advancements in computer storage and database technology. The correlation rules that were devised as tools for triage and more effective information security monitoring have been a source of noise and confusion in organizations, and the practice of information security monitoring is found in disarray. There is a need to provide a streamlined way to make informed decisions around information security monitoring activities in a day to day basis that is able to evolve with the changing network and threat landscape.

SUMMARY

Aspects of the present disclosure include methods (and corresponding systems and computer program products) for classifying malicious behavior in computer networks by applying machine learning to log data repositories that contain relevant information security events from these networks.

One aspect of this invention disclosure describes a computer implemented method that implements the usage of machine learning techniques to mine relevant features out of historical and real-time log data gathered from log management solutions, SIEM solutions and individual event or log generator sensors with the objective of using those features in predictive models that assist in classifying malicious behavior on network monitoring and incident response in an organization.

One aspect of this invention disclosure describes a computer system for implementing the usage of machine learning techniques to mine relevant features out of historical and real-time log data gathered from log management solutions, SIEM solutions and individual event or log generator sensors with the objective of using those features in predictive models that assist in classifying malicious behavior on network monitoring and incident response in an organization.

Another aspect of this invention disclosure describes a non-transitory computer-readable storage medium encoded with executable computer program code for implementing the usage of machine learning techniques to mine relevant features out of historical and real-time log data gathered from log management solutions, SIEM solutions and individual event or log generator sensors with the objective of using those features in predictive models that assist in classifying malicious behavior on network monitoring and incident response in an organization.

Thus, the present invention provides significant improvements to SIEM and log management technologies and to the technical field of information security monitoring in computer systems and networks.

Other aspects and advantages of the invention will be apparent from the following description and appended claims. For a clearer understanding, please refer to the included drawings and detailed description below.

DETAILED DESCRIPTION

Figure 1:
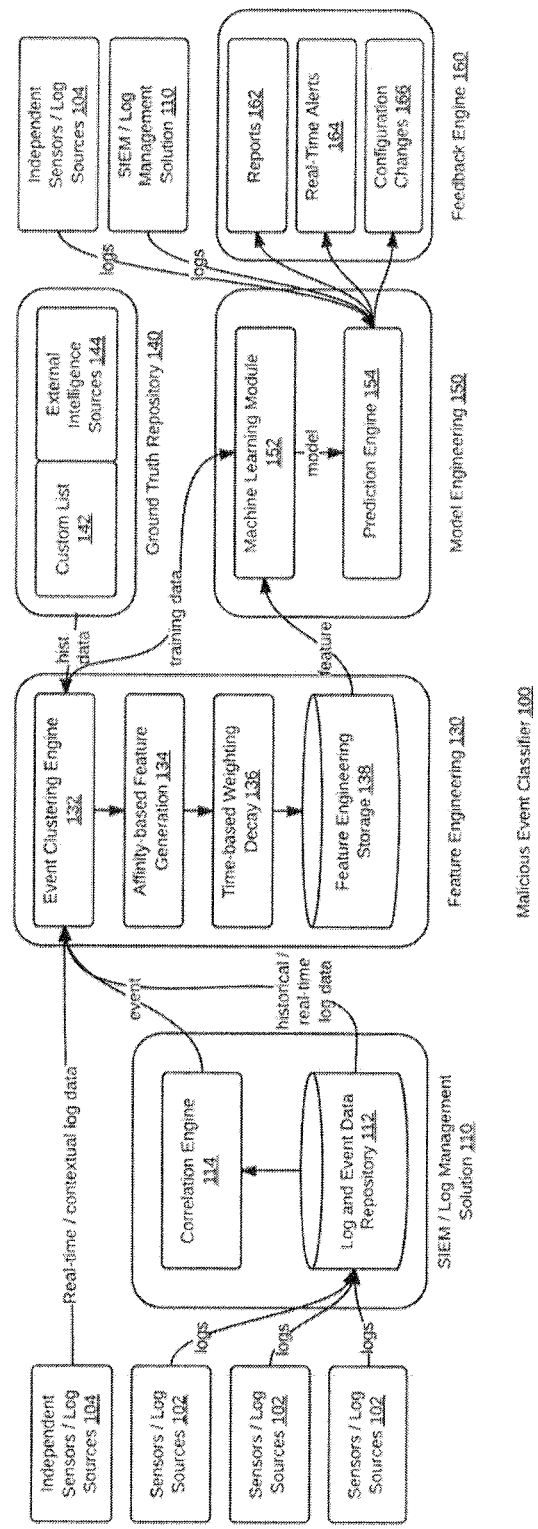
FIG. 1 is a block diagram depicting the data flow and components of aspects of the invention.

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many embodiments of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, handheld devices (including palm-top computers, wearable computers, cellular or mobile phones, multi-processor systems, processor-based or programmable consumer electronics, network computers, minicomputers) and the like.

The invention can also be practiced in distributed computing environments, where tasks or modules are performed by remote processing devices that are linked through a communications network. Moreover, the invention can be practiced in Internet-based or cloud computing environments, where shared resources, software and information may be provided to computers and other devices on demand. In a distributed computing environment, program modules or subroutines may be located in both local and remote memory storage devices. Aspects of the invention described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks. Data structures and transmissions of data particular to aspects of the invention are also encompassed within the scope of the invention.

An aspect of this invention is a representation of a machine learning based malicious event classifier, where existing historical and real-time event, log entries, interrupts and signals from an arbitrary number of event sources can be analyzed and mined for patterns that can be interpreted by a machine learning classifier. This machine learning classifier is then able to provide clear feedback to information security analysts or the log generating sources themselves to perform the necessary decisions and actions to defend the network, host, application or any other target deemed relevant to be defended on an information security monitoring practice.

The event selection as relevant or not to the monitoring aspect of the environment is conditioned to the specific embodiment of the invention that is to be implemented on the monitoring practice itself. However, the events and log data to be mined in the feature engineering aspect of the invention must have an identifiable actor that can be represented as an IP address, domain name, user name, user identifier or some other form that can be uniquely identified according to the context in which the event itself is represented.

In addition to the actor identification, the specific identity of the actor has to be able to be related to other identities by a proximity measurement or a group membership. These characteristics will vary widely based on the nature of the identity representation associated with the event, and can include group membership for user name and identifier, netblock and Autonomous System (a collection of connected Internet Protocol routing prefixes under the control of one or more network operators that presents a common, clearly defined routing policy to the Internet) membership for IP addresses, among many other examples.

In addition to the identification and proximity or group membership, the events to be analyzed must have timestamps, as they will be evaluated for feature engineering and prediction model creation on pre-defined time intervals, and their membership on a specific time interval is necessary for the correct calculation of the numeric features and their usage in the prediction model training. Additional details on the feature engineering process and the prediction model training method will be provided as the detailed block diagram of the invention is described in this disclosure.

The events that have been selected and grouped together by behavior are used to train a classification machine learning model with the previously calculated features by behavior and time interval. In one embodiment, the machine learning models are used independently to predict the likelihood of malicious activity from an identified actor, conditioned also on its behavior and the time interval in which it has been seen. Alternatively, ensemble models (combination of different classification models) created from these individual models can also be used on a prediction activity.

Given a classification prediction of malicious activity is deemed positive in the testing, the invention will then notify analysts and sensors alike by using methods consistent with the art, including reports, alerts and direct communication with sensors to perform configuration changes.

In greater detail, FIG. 1 provides a detailed description of aspects of the malicious event classifier 100. The event clustering engine 132 receives log and event data from a SIEM or log management solution 110, which in its place receives log and event data from sensors and log sources 102 that can be located in one server, multiple servers distributed in one network, several networks, interconnected or not, or any combination thereof.

These sensors and log sources 102 generate, non-exhaustively, events, log entries, interrupts and signals that relate to aspects of its subject matter functionality in network or host based sensors, systems, applications, networks and other computing embodiments. These sensors and log sources 102 and the absence or the presence of these events, log entries, interrupts and signals can be interpreted by those familiar with the art as the absence or presence of malicious activity on a computing environment.

These sensors and log sources 102 can include, non-exhaustively, for example, network routers, switching equipment or firewalls, network-based or host-based intrusion detection or prevention systems, log entries from operational aspects from applications, web servers, database, operating systems, virtualization platforms and hardware management, alerts from anti-virus and anti-malware solutions. In fact, without loss of generality, any device that is capable of generating log events or data as a registry of its operational procedures can be considered in this grouping, provided that they fulfill the necessary conditions of behavioral grouping and actor identification described further in this disclosure.

These aforementioned SIEM and log management solutions 110, as may be known in the practice of the art, include a log and event data repository 112 and a correlation engine 114.

The log and event data repository 112 continuously stores historical and real-time event, log entries, interrupts and signals as log data from the sensors and log sources 102 mentioned previously and has the property to have this data pulled or exported, in bulk or continuously, to the malicious event classifier 100.

Similarly, the SIEM or log management solution 110 includes a correlation engine 114, which generates new log entries and events that are the resultant of compositions of different events or log entries, the repetition or the absence of an specific event over a period of time, as described herein, e.g., in the BACKGROUND section.

As will be readily appreciated by practitioners of the art, these events and log entries generated by the correlation engine 114 have similar or the same properties as the base historical and real-time events and log entries present on the log and event data repository 112, and as such can be similarly pulled or exported, in bulk or continuously, to the malicious event classifier 100. In one aspect of this transfer, the event and log data generated in the correlation engine 114 is also aggregated on the log and event data repository 112 of the SIEM/log management solution 110, facilitating the transfer of the log data without loss of generality.

In one aspect, these events and log data are imported into the feature engineering 130 component of the invention, more specifically on the Event Clustering Engine 132. As described previously, these events and log data to be imported can, in one aspect, be imported from the log and event data repository 112 and the correlation engine 114 from one or more SIEM/Log management solutions 110. In another aspect of the invention, these events and log data can also be exported from, partially or in full, an independent sensor 104 that is not related to a SIEM or log management solution 110. These independent sensors 104 can, without loss of generality, be described as being the same and is able to provide the same quality of information as a previously described sensor or log source 102, the only differentiating factor being the lack of connection with a SIEM and log management system 110.

In one aspect, the Event Clustering Engine 132 of the feature engineering 130 component will select different behavioral groupings of the imported event and log data, aiming to express a specific malicious behavior that is to be predicted in the Prediction Engine 154. The behavioral grouping to be selected can be as simple or as complex as desired, but empirical results of the application of the invention show that selecting simple behaviors on the Event Clustering Engine 132 and later composing the prediction of simple behaviors by structural inference on the Prediction Engine 154 provides more consistent results.

The specific behavioral groupings can be exemplified, non-exhaustively and without loss of generality, as:
If a specific IP address was blocked when trying to access a specific network port, or this IP address was found to be engaging in port scanning activity, or has triggered detection signatures in an intrusion detection system.
Alternatively, a user, identified by its own username or identifier on an organization-wide user directory or on an internet application of any description, is found to be denied access on an specific application, or to be included or removed from an specific access role in the context where these specific usernames and applications exist.

It should be readily understood from the above that each specific event or log entry can be selected for zero or more of the behavioral groupings as they are processed by the Event Clustering Engine 132. This is a desired outcome, since any different denomination of events or log entries can be catalysts for predicting different kinds of malicious behavior by the Prediction Engine 154, and they must be aggregated and counted independently on the Affinity-based Feature Generation 134 and the Time-based Weighting Decay 136, the next steps of the Feature Engineering 130 component.

The Affinity-based feature generation 134 is responsible for the creation of numeric features for each identifiable actor on the selected behavioral grouping on each specific time interval that is being considered on an embodiment of the invention. Each identifiable actor that has an occurrence on the specific behavioral group will receive a value of 1 on that time interval, where all the actors that do not occur are given a value of 0.

In addition to assigning a value for each individual actor in a specific time-interval, the Affinity-based feature generation 134 will also calculate aggregate values based on proximity or similarity clusters on the individual actors in the behavioral groupings. The specific aggregation function will vary depending on the type of identifier, as can be inferred by practitioners of the art.

For example, IP address based actors can be aggregated by arbitrary netblock ranges or aggregated by network BGP prefixes of the Autonomous System they belong to in the Internet topology. Similarly, usernames and user identifiers can be aggregated by geographical location, company-wide directory grouping or functional roles they belong to. Also, domain names can be aggregated by TLDs (top level domain information, such as .com or .org) or Registrar (agents that register names for domains on the Internet) identifiers.

So, for each of the similarity or proximity clusterings considered on the feature generation described above, its feature rank will be incremented by 1, but can be optionally normalized by the total number of unique identifiers in the similarity grouping. A side effect of this statement is that for each proximity or similarity clustering the total number of members must be known for the specific time interval the features are being calculated, and as such it may not be possible in all embodiments of the proximity clustering step. In the groupings where this is possible, this total size of membership can certainly change from one time interval to another, but the size of the membership must be calculated and known for the time interval in which the calculation is taking place.

As mentioned above, sometimes this knowledge is not possible, and approximations must be made. For example, when considering IP addresses, there are a number of them that are not assigned to any Autonomous System on the Internet, and for all intents and purposes, should not be reachable from anywhere. These "Bogon IPs", as they are commonly called, can be placed on a category of their own, but since the amount of these Bogon IPs cannot be easily calculated, an estimate can be made by the number the Feature Engineering 130 component has seen so far, or this step can be skipped altogether for this specific clustering step. In any event, however, there must be a consistency on either normalizing the proximity clustering data or finalizing the Affinity-based feature generation 134 as-is.

By the process described above, for all behavioral groupings of events, the Affinity-based Feature Generation 134 calculates one or more features per time interval that, in one aspect, will be provided as input to the Time-based Weighting Decay 136 component, for summarization of the features per time interval.

The function of the Time-based Weighting Decay 136 component is to further summarize the feature information from the selected behaviors at the Event Clustering Engine 132 by applying a time decay function on time intervals that precede a time interval that is used as reference for a prediction.

This process is in place to represent the intuition that the entire history of a specific identifiable actor is relevant in the prediction of a specific behavior, but that events that happened closer to the time of reference on the prediction are more relevant and as such deserve to be "remembered" more clearly in the prediction process. In an information security monitoring scenario, the analysts will put more emphasis on actors that were more recently seen, as these activities could be representative of a single attack campaign.

This considered, the Time-based Weighting Decay 136 component creates, for each time interval to be used in the Model Engineering 150 component, summarized time-dependent features for each identified actor by applying a time decay function on the values previously calculated independently per time interval by the Affinity-based Feature Generation 134. This decay is applied conditioned on the distance from the time interval used as reference for the prediction activity in the Model Engineering 150 component and the time interval in the calculated feature.

So, for example, if we take a feature group having an exponential time decay process with a half-life of 7 applied to it with a reference time interval of now, the values it has calculated from the Affinity-based Feature Generation 134 from 7 time intervals ago would have half their value, where ones that had been calculated 14 time intervals ago would have a quarter of their value propagated.

The time decay functions can take multiple formats to promote feature building stability for specific Model Engineering 150 embodiments. An aspect of the invention can promote the usage of exponential time decay functions as exemplified previously, while others can use a simple step function where the only the information of the most recent event recoded to a specific actor grouping is what is generated by the Time-based Weighting Decay 136.

Finally, these Time-based Weighting Decay 136 results are all composed in the Feature Engineering Storage 138, where all these independently calculated and time-decayed values are then added for the final feature set for the actors present in each of the behavioral groupings, often limited by an origin time interval, as the exponential decay function usually invalidates contributions aged more than 120 time intervals.

The end result of the whole Feature Engineering 130 process group is then that in our Feature Engineering Storage 138 we have a feature group for each intended behavior we would like to predict based on the log data we gathered before, where all the individual actors and their relevant similarity and proximity clusterings have numerical features that are appropriately time-decayed. With these calculated features, we have the necessary tools to provide the features to the training data of a machine learning model on the Model Engineering 150 process group.

The Machine Learning Module 152 component will then use the segmented event data from the Event Clustering Engine 132 and the calculated features from the Feature Engineering Storage 138 to train the models to be used by the Prediction Engine 154. However, the Event Clustering Engine 132, given the behavioral groupings we selected, will only be able to provide data that we label as "malicious" for the purpose of training the model. In order to be able to train a balanced model, we also need to be able to provide "non-malicious" labeled actors, making use of the same feature groupings from the aforementioned "malicious" data.

For this purpose, the Ground Truth Repository 140 provides separate "non-malicious" actor lists to the Event Clustering Engine 132. These "non-malicious" actor lists can be provided by Custom Lists 142 that can be configured for specific monitoring groups or organizations, such as IPs and users "whitelists", or from External Intelligence Sources 144 of known "non-malicious actors" such as ones provided by some Internet companies regarding most visited URLs and websites repositories.

Alternatively, the External Intelligence Sources 144 can also provide ground truth for malicious behavior as to improve the number of entries and the breadth of the calculated features for the behavioral groupings. As known by practitioners of the art, there is a great number of free and paid lists of actors that have been confirmed to engage in malicious activity, such as lists of IP addresses involved in port scanning and botnet command and control servers (the servers that can control the botnet group remotely). In one aspect of the invention, these malicious External Intelligence Sources 144 would be considered for all intents and purposes to be equivalent to log data that is ingested from the SIEM/Log Management Solution 110 or independent sensors/log sources 104.

Having both the malicious and non-malicious event sources, and the calculated features from the Feature Engineering Storage 138, the Machine Learning Module can then train a model for each behavior and time interval association, by performing the following process:

Initially, we select a machine learning algorithm to perform the classification of the model, and any algorithm that has a good stability for classification using numeric features can be used, as known by practitioners of the art. A non-exhaustive list includes support vector machines, logistic regression, stochastic gradient descent and some sub-groups of artificial neural networks.

Having selected the model, we then require gathering enough occurrences from the specific behavioral grouping that we would like to build the model to predict. As mentioned previously, we create a model for performing prediction on each time interval, and as such, we need to select occurrences from time intervals that happened before the time interval we wish to predict, but as close to the predicted time interval as possible.

The number of observations we need is conditioned to the algorithm we select, and it should be at least 10 times the expected dimensionality of the model. Empirically, it has been found that the vicinity of tens of thousands of observations has been enough to provide a stable prediction model for the invention, but this number will vary on different aspects of the invention that may use different prediction models.

With a target number of observations, we gather the occurrences from the behavioral grouping we wish, starting with the closest previous time interval we have data for, gathering as much occurrences from this data we can and then when it is exhausted, we gather the remaining observations from the immediately previous time-interval we have data from. For each one of these observations, we gather the features from the respective consolidated time-interval form the Feature Engineering Storage 138. Picking the respective time-interval for feature composition is very important, otherwise, as known by practitioners of the art, survival bias would be introduced into the model, where the specific occurrence would be paired with features that had not happened on the time-interval when it had been observed.

After selecting the malicious occurrences, we also select an equal number of non-malicious occurrences from that have been contributed by the Ground Truth Repository 140, using the process described previously. As mentioned before, this is done in order to balance the model between malicious and non-malicious occurrences and ensure that it would not default to the trivial solution.

In one aspect, a scaling factor can be applied to adjust the ratio between malicious and non-malicious behavior in the model. As is known by practitioners of the art, a classification machine learning model can produce false positives (where a non-malicious event is classified as malicious) and false negatives (where a malicious event is classified as non-malicious). This ratio tweaking can be performed if there is a necessity to adjust the misclassification errors that the model can present, since adding more non-malicious events then malicious events will reduce the classification error for non-malicious (false positives), usually at the expense of the efficacy of the other error metric.

In some aspects, additional scaling and adjustments can be made on the data stored provided in the Feature Engineering Storage 138 to prevent the model from over-fitting the most recent data, which could hinder its inference properties.

With all the data selected, the prediction model for the specific behavioral grouping and time interval is calculated in the Machine Learning Model 152 and made available to the Prediction Engine 154, thus completing the necessary preparation for its usage.

The Prediction Engine 154 is then responsible for receiving new instances of event and log data from SIEM/Log Management Solutions 110 and independent sensors and log sources 104, in real-time or in bulk, and given the possible behavioral groupings of these incoming log data, predict their likelihood to be malicious by using the models calculated in the Machine Learning Module 152. An important result from this is that a specific event or event grouping can be run against more than one prediction model, given what that event represents in relation to the behavioral groupings that have been chosen in the Event Clustering Engine 132 and the available identifiable actors in the event information.

In one aspect, these independent results from different behavioral grouping models can be combined in an overall result to provide a stronger expression of the overall likelihood a specific actor is malicious. This can be done on a similar manner as the calculation of an ensemble model in the art of machine learning, with different models having different weights in the composition of the final result. These weights themselves can be inferred from training a composition model from the likelihood that different behavioral groups are correlated.

For example, if we have an event on a network where a username from a specific IP address accesses an application on a specific network port successfully, the identifying actors on this event (IP address and username), can be run against behavioral models of IP addresses attempting to attack specific ports and usernames attempting to perform malicious activities on that specific application. The independent results for the models can then be combined or reported separately.

Independently of the result achieved, the received event and log data are then forwarded to the Feature Engineering 130 component of the invention to be part of the calculation of feature sets and models for future time intervals on the behavioral groupings they match.

The prediction model results on the Prediction Engine 154 are then provided to the Feedback Engine 160, which will notify the results to the monitoring team in a variety of forms, such as Reports 162 or Real-Time Alerts 164. In one aspect of the invention, this can be provided through a dedicated computer system where the invention is implemented, or by providing signals and information for the report to be displayed on a separate computer system that provides these reporting capabilities.

In one aspect, a completely different class of feedback can be provided by having the functionality to export Configuration Changes 166 to the sensors and log sources 102 and the independent sensors and log sources 104 so that these components can provide a proper source of active response to the attempted malicious behavior. One example of this functionality would be to instruct a firewall to block future traffic to and/or from a specific IP address because it has been found to be malicious by a number of behavioral grouping models.

Figure 2:
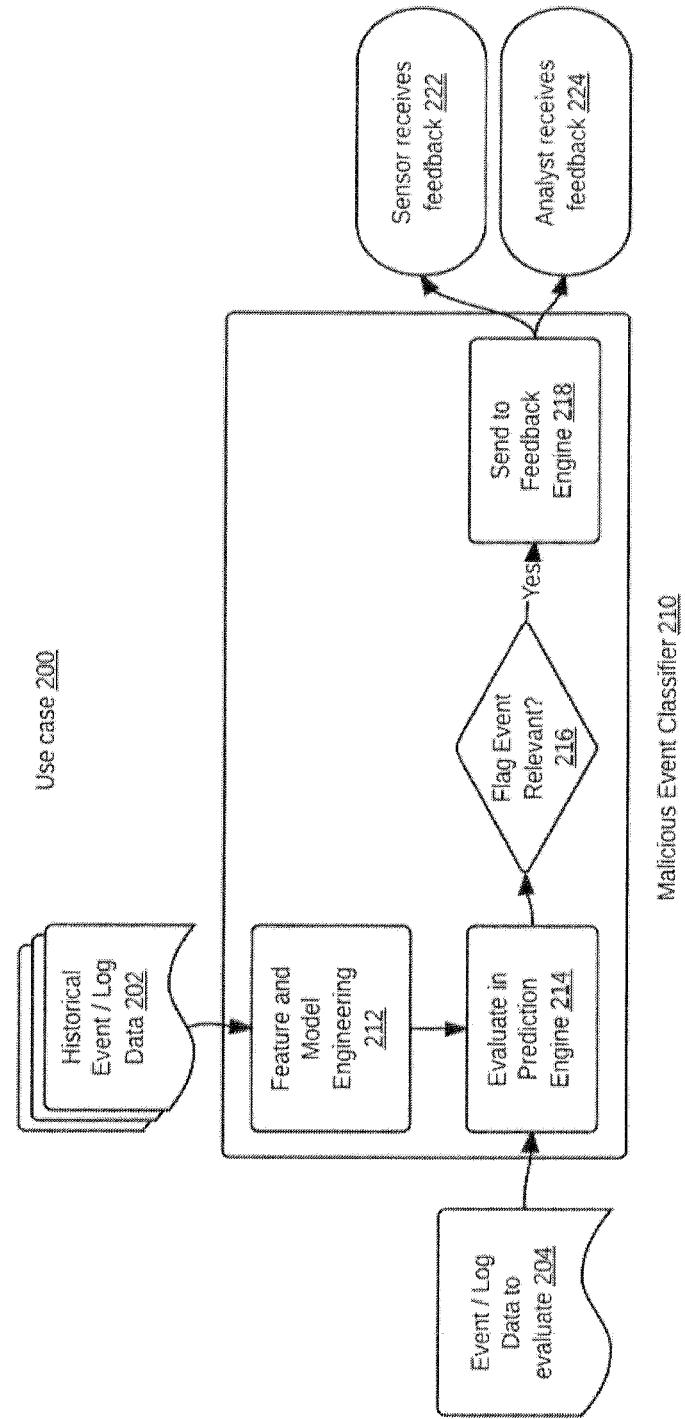
FIG. 2 illustrates a usage example of malicious event classification according to aspects of the invention.

FIG. 2 is a simplified block diagram illustrating usage of the invention. In this use case 200, an embodiment of the invention in a computer system, represented by the malicious event classifier 210, receives in bulk historical log data 202 from a specific organization, which is interested on predicting attacks to its internet web site that receives connections on port 80.

With this mandate, the Feature and Model Engineering 212 component will look for confirmed malicious behavior on this specific port, creating behavioral groupings for results such as IP addresses that have been blocked by firewalls or other network filtering tools on this specific port, or alerts from intrusion detection or prevention systems related IP addresses performing malicious web server of web site activity in that specific application. Having selected the behavioral groupings, the component proceeds to calculate the features and the prediction models.

The organization then will provide log data and event information 204 from different sources, such as web server logs, or from non-malicious results of the same sources, such as connections that were allowed in the firewall or network filtering tool. This information will be provided for Evaluation in the Prediction Engine 214, which will check these events against the selected behavioral models to pinpoint the likelihood of malicious behavior that would have been missed by the prescriptive information security tools.

Then, if the Event is Flagged Relevant 216 by the ensemble of the prediction models on the behavior groupings, this is Sent to the Feedback Engine 218, that, according to its configuration on the embodiment, will then proceed to reconfigure the sensor or information security tool 222 to provide a proper response to this event or alert the analysts 224 to investigate this event further or take action towards it.

Figure 3:
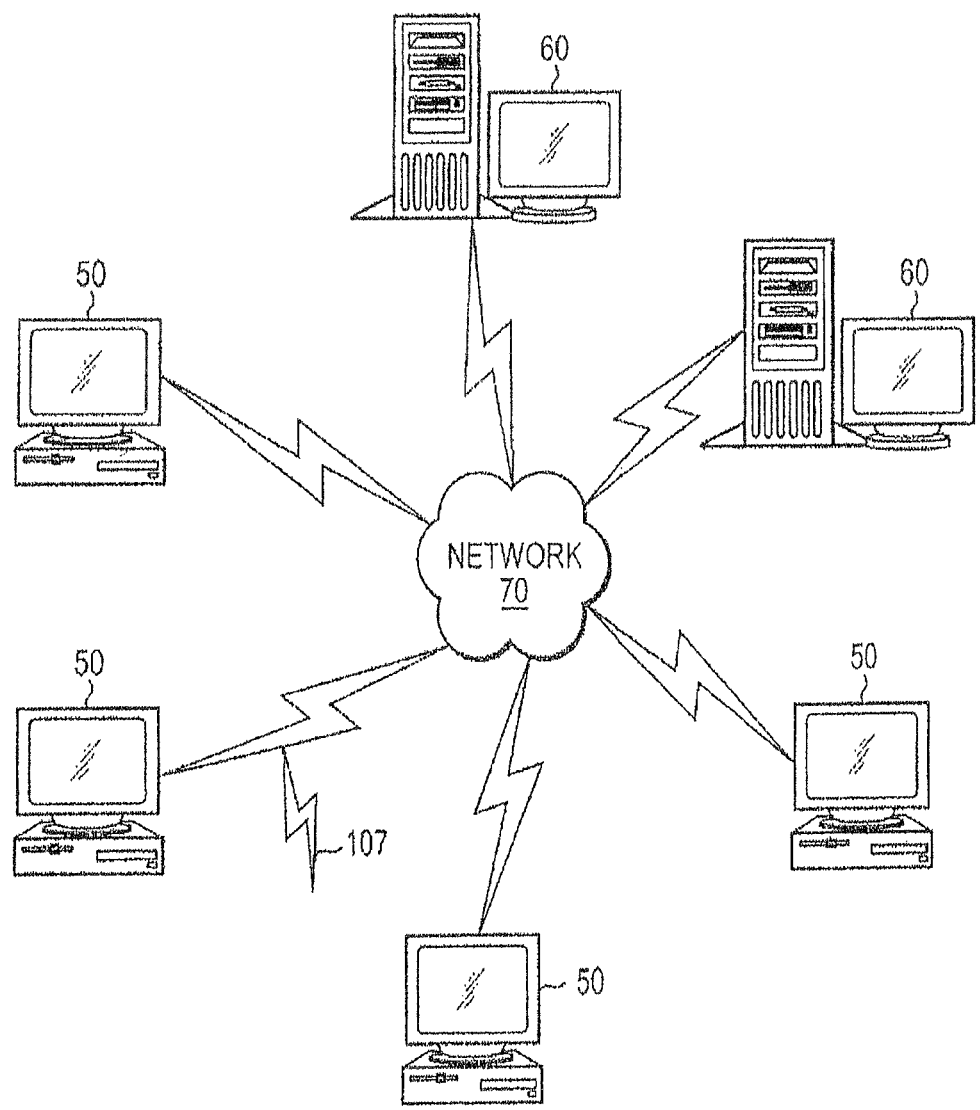
FIG. 3 is a schematic diagram of a computer network environment in which embodiments of the present invention are implemented.

FIG. 3 illustrates a computer network or similar digital processing environment in which the foregoing and other embodiments of the present invention may be implemented.

Client computers/devices 50 and server computers 60 provide processing, storage, and input/output devices executing application programs and the like. Client computers/devices 50 can also be linked through communications network 70 to other computing devices, including other client computers/devices 50 and server computers 60. Servers 60 in FIGS. 3 and 4 may include application store servers and the like. Communications network 70 can be part of a remote access network, a global network (e.g., the Internet), a worldwide collection of computers, Local area or Wide area networks, and gateways that use any known respective protocols (TCP/IP, Bluetooth, etc.) to communicate with one another. Other electronic device/computer network architectures may be suitable, as known by those skilled in the relevant arts.

Figure 4:
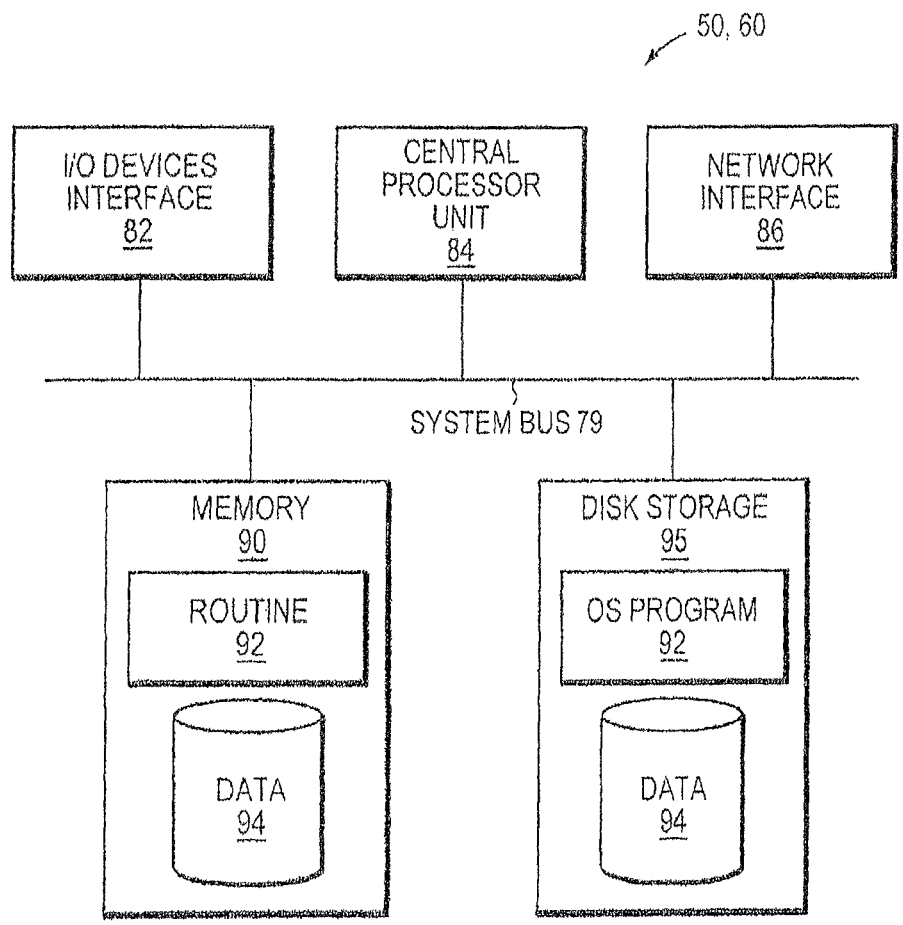
FIG. 4 is a block diagram of a computer in the network of FIG. 3.

FIG. 4 is a diagram of the internal structure of a computer (e.g., client computer/device 50 or server computers 60) in the computer system of FIG. 3. Each computer 50, 60 contains a system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement embodiments of the present invention (e.g., code for implementing malicious event classifier 100 of FIG. 1, including feature engineering 130, model engineering 150 and/or feedback engine 160, as well as code implementing the use case 200 of FIG. 2, as described and detailed above). Disk storage 95 provides non-volatile storage for computer software instructions 92 and data 94 used to implement embodiments of the present invention. Central processor unit 84 is also attached to system bus 79 and provides for the execution of computer instructions.

In an embodiment, the processor routines 92 and data 94 are a computer program product (generally referenced 92), including a computer readable medium (e.g., a removable storage medium such as one or more DVD-ROMs, CD-ROMs, flash memory drives, diskettes, tapes, etc.) that provides at least a portion of the software instructions for implementing the present invention. Computer program product 92 can be installed by any suitable software installation procedure, as is well known in the art. In another embodiment, at least a portion of the software instructions may also be downloaded over a cable, communication and/or wireless connection.

It should be emphasized that the above-described embodiments of the present system and methods are merely possible examples of implementations and are merely set forth for a clear understanding of the principles of the invention. Many different embodiments of the systems and methods described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

What is claimed is:

1. A system for classifying events on a computer network comprising:
   a feature engineering module on a host computer having a non-transitory memory and a processor, the feature engineering module comprising:
      an event clustering engine hosted on the non-transitory memory, wherein the event clustering engine receives event and log data related to identifiable actors from a security information and event management (SIEM) or log management module and selects behavioral groupings of the event and log data;
      an affinity-based feature generation module hosted on the non-transitory memory and in communication with the event clustering engine, wherein the affinity-based feature generation module assigns a value to each identifiable actor based on occurrences within predetermined time intervals of the identifiable actors having the selected behavioral grouping, wherein the value is assigned to each identifiable actor for each event within the event and log data;
      a time-based weighting decay module hosted on the non-transitory memory and in communication with the affinity-based feature generation module, wherein the time-based weighting decay module applies a time decaying function to the assigned values for each identifiable actor at a reference time, wherein the time decaying function is weighted based on an occurrence time of an event within the event and log data relative to the reference time; and
      a feature engineering storage module hosted on the non-transitory memory and in communication with the time-based weighting decay module, wherein information relating to the identifiable actors and their associated time-decayed values are stored on the feature engineering storage module; and
   a prediction model generated by a machine learning module on a host computer based on information received from the event clustering engine and the time-based weighting decay module, wherein the prediction model is utilized by a prediction engine on a computer to predict and classify received event and log data as malicious or non-malicious for each event within the event and log data.

2. The system of claim 1, wherein the identifiable actors are identifiable by at least one of: an IP address, a domain name, a user name and a user identifier that can be uniquely identified according to the context in which the event itself is represented.

3. The system of claim 1, wherein the identifiable actors are related to other identifiable actors by a proximity measurement or a group membership.

4. The system of claim 1, wherein the event clustering engine is further configured to receive event and log data from an independent sensor.

5. The system of claim 1, wherein the behavioral groupings selected by the event clustering engine relate to one or more of: whether an IP address associated with an identifiable actor was blocked when trying to access a specific network port; whether an IP address associated with an identifiable actor was found to be engaging in port scanning activity or has triggered detection signatures in an intrusion detection system; whether a user, associated with an identifiable actor by a username or other identifier on an organization-wide user director or on an internet application, is found to be denied access on a specific application, or to be included or removed from a specific access role.

6. The system of claim 1, wherein the affinity-based feature generation module is further configured to assign an aggregate value to each feature grouping of identifiable actors belonging to them based on proximity or similarity clusters of the actors in the selected behavioral groupings, wherein the proximity or similarity clusters are based on a grouping identifier of the identifiable actor, wherein the grouping identifier is received external from the event and log data.

7. The system of claim 1, wherein the feature engineering module and the machine learning module are on the same host computer, and the prediction engine is on a user computer.

8. The system of claim 1, wherein the feature engineering module, the machine learning module and the prediction engine are on the same computer.

9. The system of claim 1, wherein the event clustering engine is further configured to receive data identifying known malicious or non-malicious actors from at least one of a ground truth repository and external intelligence sources.

10. The system of claim 1, wherein the machine learning module generates a prediction model based on an equal number of malicious and non-malicious events.

11. The system of claim 1, wherein the prediction engine provides information relating to the classified event and log data to a monitoring computer.

12. A computer-implemented method of classifying events on a computer network comprising:
- receiving by an event clustering engine event and log data related to identifiable actors from a security information and event management (SIEM) or log management module;
- selecting behavioral groupings of the event and log data;
- assigning, by an affinity-based feature generation module, a value to each identifiable actor for each event within the event and log data based on occurrences within predetermined time intervals of the identifiable actors having the selected behavioral grouping;
- applying, by a time-based weighting decay module, a time decaying function to the assigned values for each identifiable actor at a reference time, and weighting the time decay function based on an occurrence time of an event within the event and log data relative to the reference time;
- storing information relating to the identifiable actors and their associated time-decayed values;
- generating, by a machine learning module, a prediction model based on information received from the event clustering engine and the time-based weighting decay module; and
- predicting and classifying by a computer, based on the prediction model, received event and log data as malicious or non-malicious for each event within the event and log data.

13. The method of claim 12, wherein the identifiable actors are identifiable by at least one of: an IP address, a domain name, a user name and a user identifier that can be uniquely identified according to the context in which the event itself is represented.

14. The method of claim 12, further comprising:
- associating identifiable actors with other identifiable actors by a proximity measurement or a group membership.

15. The method of claim 12, further comprising:
- receiving by the event clustering engine event and log data from an independent sensor.

16. The method of claim 12, wherein the behavioral groupings selected by the event clustering engine relate to one or more of: whether an IP address associated with an identifiable actor was blocked when trying to access a specific network port; whether an IP address associated with an identifiable actor was found to be engaging in port scanning activity or has triggered detection signatures in an intrusion detection system; whether a user, associated with an identifiable actor by a username or other identifier on an organization-wide user director or on an internet application, is found to be denied access on a specific application, or to be included or removed from a specific access role.

17. The method of claim 12, further comprising:
- assigning an aggregate value to each feature grouping of identifiable actors belonging to them based on proximity or similarity clusters of the actors in the selected behavioral groupings, wherein the proximity or similarity clusters are based on a grouping identifier of the identifiable actor, wherein the grouping identifier is received external from the event and log data.

18. The method of claim 12, further comprising:
- receiving by the event clustering engine data identifying known malicious or non-malicious actors from at least one of a ground truth repository and external intelligence sources.

19. The method of claim 12, further comprising:
- providing information relating to the classified event and log data to a monitoring computer.

20. A non-transitory computer readable medium containing instructions for providing a process of classifying events on a computer network enabled at least in part on a processor of a computerized device, the instructions, which when executed by the processor, performing the steps of:
- receiving by an event clustering engine event and log data related to identifiable actors from a security information and event management (SIEM) or log management module;
- selecting behavioral groupings of the event and log data;
- assigning, by an affinity-based feature generation module, a value to each identifiable actor for each event within the event and log data based on occurrences within predetermined time intervals of the identifiable actors having the selected behavioral grouping;
- applying, by a time-based weighting decay module, a time decaying function to the assigned values for each identifiable actor at a reference time, and weighting the time decay function based on an occurrence time of an event within the event and log data relative to the reference time;
- storing information relating to the identifiable actors and their associated time-decayed values;
- generating, by a machine learning module, a prediction model based on information received from the event clustering engine and the time-based weighting decay module; and
- predicting and classifying, based on the prediction model, received event and log data as malicious or non-malicious for each event within the event and log data.

* * * * *